US010997058B2

(12) United States Patent
Shveidel et al.

(10) Patent No.: US 10,997,058 B2
(45) Date of Patent: May 4, 2021

(54) METHOD FOR PERFORMANCE ANALYSIS IN A CONTINUOUS INTEGRATION PIPELINE

(71) Applicant: EMC IP Holding Company LLC, Hopkinton, MA (US)

(72) Inventors: Vladimir Shveidel, Pardes-Hana (IL); Vladimir Kleiner, Yehud (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 147 days.

(21) Appl. No.: 16/048,698

(22) Filed: Jul. 30, 2018

(65) Prior Publication Data

US 2020/0034277 A1 Jan. 30, 2020

(51) Int. Cl.
G06F 11/36 (2006.01)
G06F 8/65 (2018.01)

(52) U.S. Cl.
CPC ...... G06F 11/3644 (2013.01); G06F 11/3664 (2013.01); *G06F 8/65* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,587,967 B1 * | 7/2003 | Bates | ................. | G06F 11/3664 714/35 |
| 6,598,012 B1 * | 7/2003 | Berry | ................. | G06F 11/3466 702/187 |
| 6,971,104 B2 * | 11/2005 | Kalafatis | ............... | G06F 9/3802 712/219 |
| 6,988,264 B2 * | 1/2006 | Sarma | .................. | G06F 11/362 717/127 |
| 7,146,529 B2 * | 12/2006 | Aguilar, Jr. | ......... | G06F 11/0715 714/10 |
| 7,518,993 B1 * | 4/2009 | Dennis | ............... | G06F 9/30079 370/235 |
| 8,468,324 B2 * | 6/2013 | Chen | ..................... | G06F 9/3012 712/205 |
| 8,909,990 B2 * | 12/2014 | Davis | ................. | G06F 11/3096 714/37 |
| 10,445,133 B2 * | 10/2019 | Gamoneda | ........... | G06F 11/302 |
| 2003/0005380 A1 * | 1/2003 | Nguyen | ............... | G06F 11/273 714/736 |

(Continued)

*Primary Examiner* — Amine Riad
(74) *Attorney, Agent, or Firm* — Daly, Crowley Mofford & Durkee, LLP

(57) ABSTRACT

A method is provided comprising: executing a first set of files, and collecting a first set of performance data; updating the first set of files to produce a second set of files; executing the second set of files and collecting a second set of performance data; identifying a first subset of the first set of performance data; identifying a second subset of the first set of performance data; calculating a score based on the first subset and the second subset, the score indicating a difference in resource consumption between one or more first thread instances that are instantiated using the first set of files and one or more second thread instances that are instantiated using the second set of files; and generating and outputting a debugging message based on the score, wherein the first thread instances and the second thread instances have the same entry function and the same opcode.

20 Claims, 14 Drawing Sheets

(56) References Cited

U.S. PATENT DOCUMENTS

| | | | |
|---|---|---|---|
| 2005/0154860 A1* | 7/2005 | Arimilli | G06F 11/3466 712/216 |
| 2006/0069953 A1* | 3/2006 | Lippett | G06F 11/3636 714/25 |
| 2009/0138857 A1* | 5/2009 | Botzer | G06F 11/3612 717/129 |
| 2013/0067438 A1* | 3/2013 | Bates | G06F 9/485 717/124 |

* cited by examiner

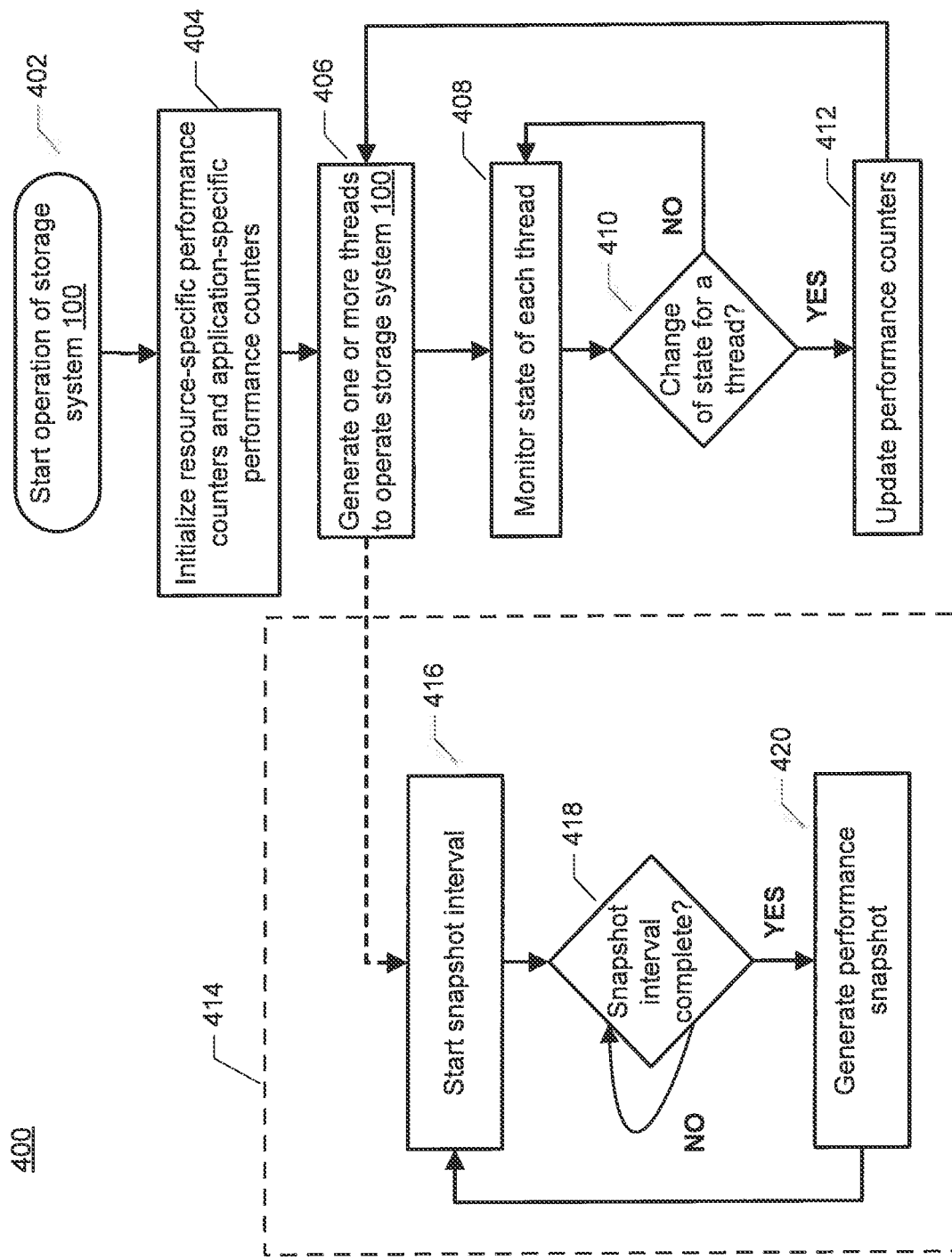

420

METHOD FOR PERFORMANCE ANALYSIS IN A CONTINUOUS INTEGRATION PIPELINE

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: executing a first set of files on a computing system, and collecting a first set of performance data based on the executing of the first set of files; updating the first set of files to produce a second set of files; executing the second set of files on the computing system and collecting a second set of performance data based on the executing of the second set of files; identifying a first subset of the first set of performance data, the first subset corresponding to an execution of one or more first thread instances, the first thread instances being instantiated using the first set of files; identifying a second subset of the first set of performance data, the second subset corresponding to an execution of one or more second thread instances, the second thread instances being instantiated using the second set of files; calculating a score based on the first subset and the second subset, the score indicating a difference in resource consumption between the first thread instances and the second thread instances; and generating and outputting a debugging message based on the score, wherein the first thread instances and the second thread instances have at least one of the same entry function and the same opcode.

According to aspects of the disclosure, an apparatus is provided comprising: one or more processors; and a memory configured to store one or more processor executable instructions, which when executed by the one or more processors cause the one or more processors to perform a method comprising the steps of: executing a first set of files, and collecting a first set of performance data based on the executing of the first set of files; updating the first set of files to produce a second set of files; executing the second set of files and collecting a second set of performance data based on the executing of the second set of files; identifying a first subset of the first set of performance data, the first subset corresponding to an execution of one or more first thread instances, the first thread instances being instantiated using the first set of files; identifying a second subset of the first set of performance data, the second subset corresponding to an execution of one or more second thread instances, the second thread instances being instantiated using the second set of files; calculating a score based on the first subset and the second subset, the score indicating a difference in resource consumption between the first thread instances and the second thread instances; and generating and outputting a debugging message based on the score, wherein the first thread instances and the second thread instances have at least one of the same entry function and the same opcode, and wherein the first thread instances and the second thread instances are both instances of a set of one or more threads that is defined in both the first set of files and the second set of files.

According to aspects of the disclosure, a non-transitory computer-readable medium is provided that is configured to store one or more processor-executable instructions, which when executed by at least one processor cause the at least one processor to perform a method comprising the steps of: executing a first set of files on a computing system, and collecting a first set of performance data based on the executing of the first set of files; updating the first set of files to produce a second set of files; executing the second set of files on the computing system and collecting a second set of performance data based on the executing of the second set of files; identifying a first subset of the first set of performance data, the first subset corresponding to an execution of one or more first thread instances, the first thread instances being instantiated using the first set of files; identifying a second subset of the first set of performance data, the second subset corresponding to an execution of one or more second thread instances, the second thread instances being instantiated using the second set of files; calculating a score based on the first subset and the second subset, the score indicating a difference in resource consumption between the first thread instances and the second thread instances; and generating and outputting a debugging message based on the score, wherein the first thread instances and the second thread instances have at least one of the same entry function and the same opcode.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 4 is a flow diagram of an example of a process to operate the storage system of FIG. 1 in accordance with an illustrative embodiment;

DETAILED DESCRIPTION

Figure 1:
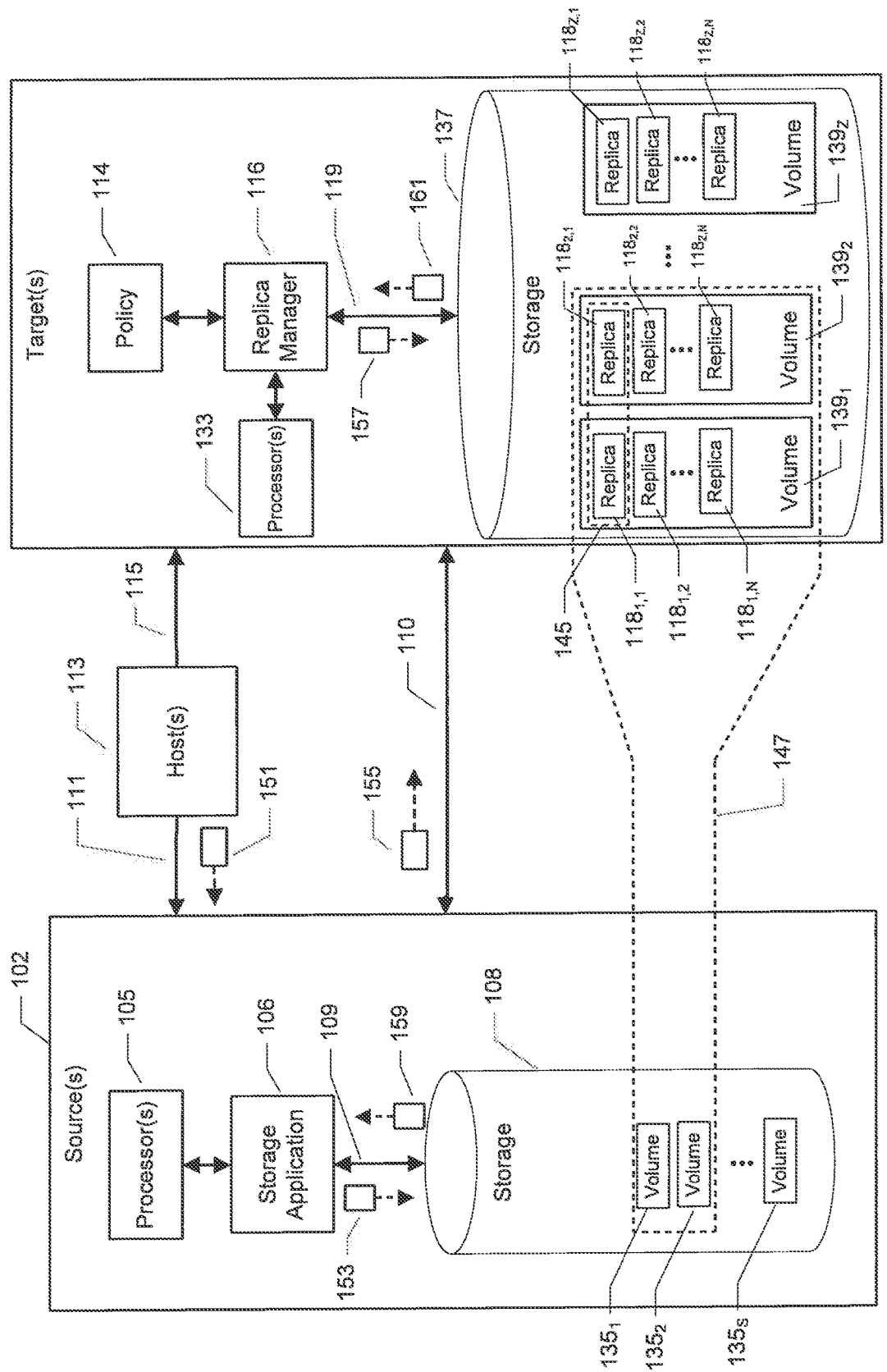
FIG. 1 is a block diagram of an example of a storage system in accordance with an illustrative embodiment.

FIG. 1 shows an example storage system 100, in accordance with illustrative embodiments. Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may perform operations to replicate data from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol. In some embodiments, one or both of source site 102 and/or target site 112 may include one or more internal (e.g., short distance) communication links (shown as communication links 109 and 119), such as an InfiniBand (IB) link or Fibre Channel (FC) link. Communication link 109 may be employed to transfer data between storage volumes $135_{1-S}$ of storage 108 and one or both of storage application 106 and processor(s) 105. Communication link 119 may be employed to transfer data between storage volumes $139_{1-Z}$ of storage 137 and one or both of replica manager 116 and processor(s) 133.

In illustrative embodiments, target site 112 may include replica manager 116 that manages a plurality of replicas $118_{1-N}$ according to a policy 114 (e.g., a replication and/or retention policy). Replicas 118 may be stored in one or more volumes $139_{1-Z}$ of storage 137 of target site 112. A replica (or snapshot) may be created from data within storage 108 and transferred to one or more target sites 112 during a data replication cycle that may be performed based on data replication policies (e.g., policy 114) that may define various settings for data recovery operations. A data replication cycle may be asynchronous data replication performed at time-based intervals during operation of storage system 100, or may alternatively be synchronous data replication performed when data is changed on source site 102.

In illustrative embodiments, storage system 100 may include one or more consistency groups. A consistency group 147 may include one or more volumes 135 of source site 102, each associated with a corresponding volume 139 of target site 112. Consistency group 147 may treat source volumes 135 and target volumes 139 as a single logical entity for data replication and migration. Each volume 139 may store one or more associated replicas 118 that reflect the data in the consistency group 147 at a point in time (e.g., when the replica 118 was created). For example, replicas (e.g., snapshots) 118 may be generated for each source volume 135 of consistency group 147 at the same time, and stored on associated ones of target volumes 139. As shown in FIG. 1, an illustrative consistency group 147 may include two source volumes $135_1$ and $135_2$ and two target volumes $139_1$ and $139_2$. Each of target volumes $139_1$ and $139_2$ may include one or more replicas 118. In some embodiments, replicas 118 for respective source volumes 135 of consistency group 147 may be grouped into sets (e.g., a snapshot set or snapset 145).

Figure 2:
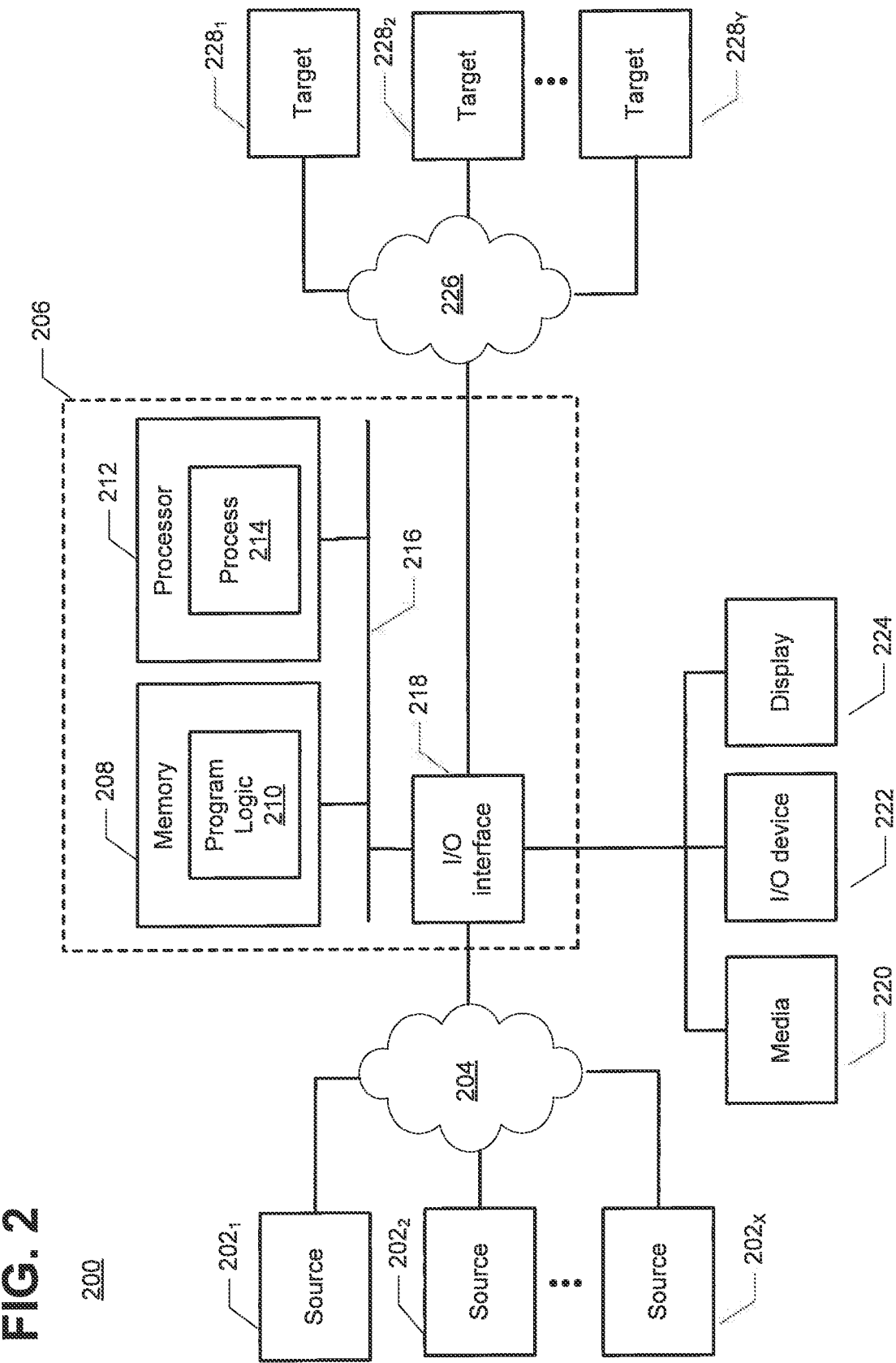
FIG. 2 is a block diagram of another example of a storage system in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments, communications I/O interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network.

Figure 3A:
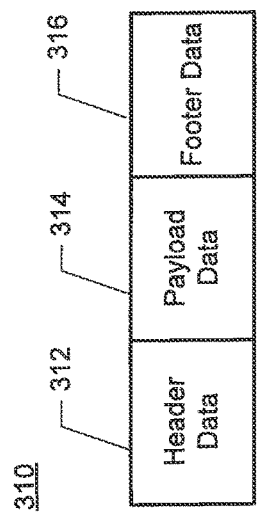
FIG. 3A is a block diagram of an example data packet of an input/output (I/O) operation of the storage system of FIG. 1 in accordance with an illustrative embodiment.

Referring back to FIG. 1, in some embodiments, one of hosts 113 may send an I/O request (e.g., I/O request 151) to perform an I/O operation on storage 108 of source site 102. For example, I/O request 151 may be a request to read an associated amount of data from storage 108, or may be a request to write an associated amount of data to storage 108. In some embodiments, I/O request 151 may include one or more data packets. For example, FIG. 3A shows a block diagram of an illustrative data packet 310. As shown in FIG. 3A, in some embodiments, data packet 310 may include one or more of header data 312, payload data 314 and footer data 316. Payload data 314 may be the data to be written to storage 108 or data that is read from storage 108 (e.g., user data), and header data 312 and/or footer data 316 may be data associated with I/O request 151 that may be employed by storage system 100 to process I/O request 151 (e.g., source and/or destination address information, error correction information, data and/or packet format information, metadata, and other information).

In some embodiments, payload data 314 may be segmented into one or more payload data segments to be written to storage 108 (e.g., by one or more write operations 153) or read from storage 108 (e.g., by one or more read operations 159). For example, if payload data 314 is 256 KB, payload data 314 may be segmented into sixteen 16 KB payload data segments to be written to storage 108. When I/O request 151 is a write request, processor(s) 105 and/or storage application 106 may then perform one or more corresponding write operations (e.g., write operation 153) to write payload data associated with the one or more data packets (e.g., one or more payload data segments) of I/O request 151 to storage 108. When I/O request 151 is a read request, processor(s) 105 and/or storage application 106 may then read data from storage 108 in one or more packets (e.g., one or more read operations 159) to process I/O request 151 from storage 108.

In illustrative embodiments, source site 102 may send a replica (e.g., replica 155) to target site 112. Similarly to write request 151, replica 155 may include one or more data packets such as shown in FIG. 3A. Processor(s) 133 and/or replica manager 116 may then perform one or more corresponding write operations (e.g., write operation 157) to write payload data (e.g., one or more payload data segments) associated with the one or more data packets of replica 155 to storage 137. Similarly, replica manager 161 may read replica data from storage 137 by one or more read operations 161. In some embodiments, data packet 310 may be a data packet formatted in accordance with the TCP/IP and iSCSI protocols.

Figure 3B:
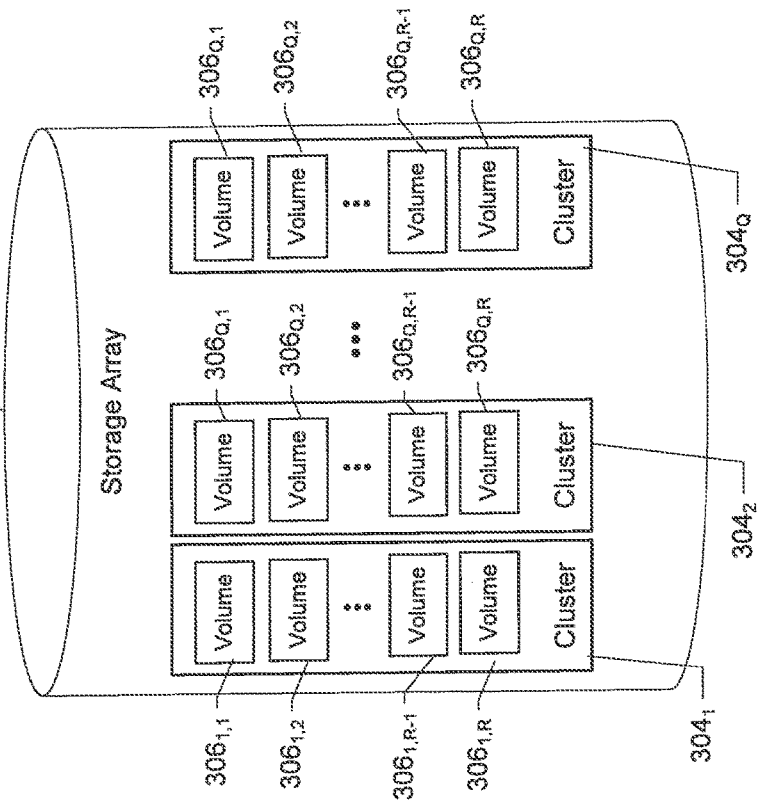
FIG. 3B is a block diagram of an example storage array of the storage system of FIG. 1 in accordance with an illustrative embodiment.

Referring to FIG. 3B, a block diagram of an illustrative storage array 302 is shown. For example, in illustrative embodiments, one or both of storage 108 and storage 137 may be implemented as storage array 302. As shown, in some embodiments, storage array 302 may include one or more clusters $304_1$-$304_Q$ (referred to generally as clusters 304) where Q may be a positive integer. In illustrative embodiments, clusters 304 may include one or more physical and/or virtual storage volumes, shown generally as storage volumes 306. For example, cluster $304_1$ may include storage volumes $306_{1,1}$-$306_{1,R}$, where R may be a positive integer. For example, clusters 304 may include one or more physical storage volumes such as hard disk drives (HDDs), solid state drives (SSDs) such as flash drives, a hybrid magnetic and solid state drive, etc., and/or one or more virtual storage volumes, such as a cloud storage, or a combination of physical storage volumes and virtual storage volumes.

Described embodiments provide performance analysis of storage system 100. Some embodiments may employ one or more performance counters associated with resources of storage system 100 (e.g., CPU resources, operating system resources, etc.), and one or more application-specific or task-specific performance counters associated with individual applications, services or tasks of storage system 100. Described embodiments provide a manner for identifying relationships between the various performance counters and the application flow without requiring manual instrumentation upgrades with each new version of operating system (OS) software for storage system 100.

Figure 3C:
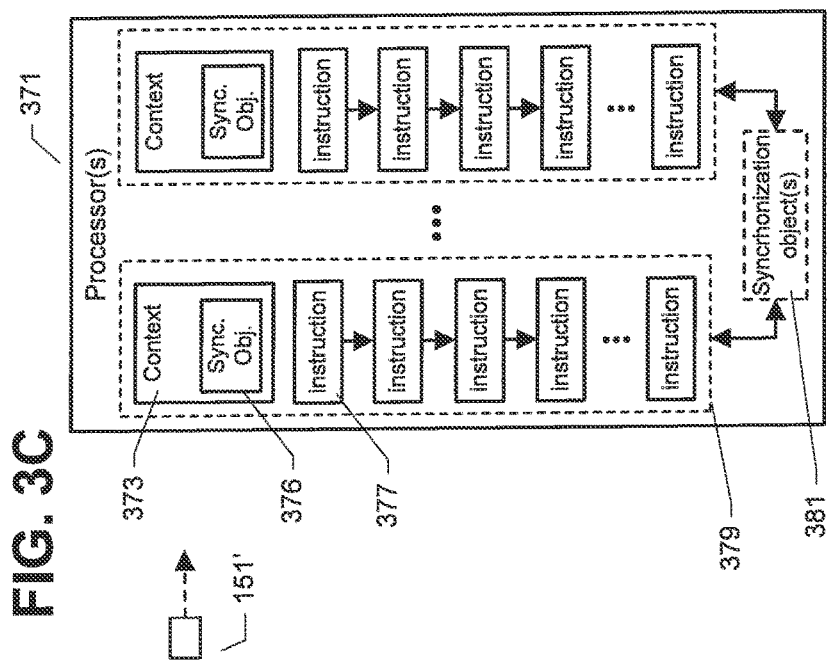
FIG. 3C is a block diagram showing example threads of the storage system of FIG. 1 in accordance with an illustrative embodiment.

Described embodiments may employ one or more threads to perform operations of storage system 100 (e.g., operations associated with I/O request 151). For example, as shown in FIG. 3C, processors 371 (e.g., one or more or processors 105 and/or processors 133) may employ one or more threads 379. Each thread 379 may be a thread of one or more instructions 377 that are performed by storage system 100. Each thread 379 may also include context 373. Context 373 may include one or more synchronization objects 376. In some embodiments, threads 379 may optionally be in communication with one or more external synchronization objects 381. For example, synchronization objects 376 and/or 381 may include a lock, a semaphore, or an event, by which threads may communicate with one another.

Illustrative embodiments may monitor performance of threads (e.g., 379) that are grouped by the application-level task the threads perform. For example, some embodiments may group threads based on the thread's entry function and/or an additional operation code.

Some embodiments may monitor performance of tasks using directed-graphs (diagrams). The performance data may be collected in one or more points-of-interest into performance data containers. Performance data containers may be presented as nodes and edges of the directed-graph related to a specific task. For example, a performance data container may be represented as a node of a directed-graph for a specific task. An example of a performance data container that may be represented as a node is an OS synchronization object (e.g., synchronization objects 376 and/or 381 of FIG. 3C). Sequences of processor instructions (e.g., instructions 377 of FIG. 3C) between two nodes may be represented as edges of a directed-graph for a specific task. Since each node represents a system resource, data structure or a stage of processing for a given task, the directed-graph provides a visual representation of processing flows for a given task.

Figure 6:
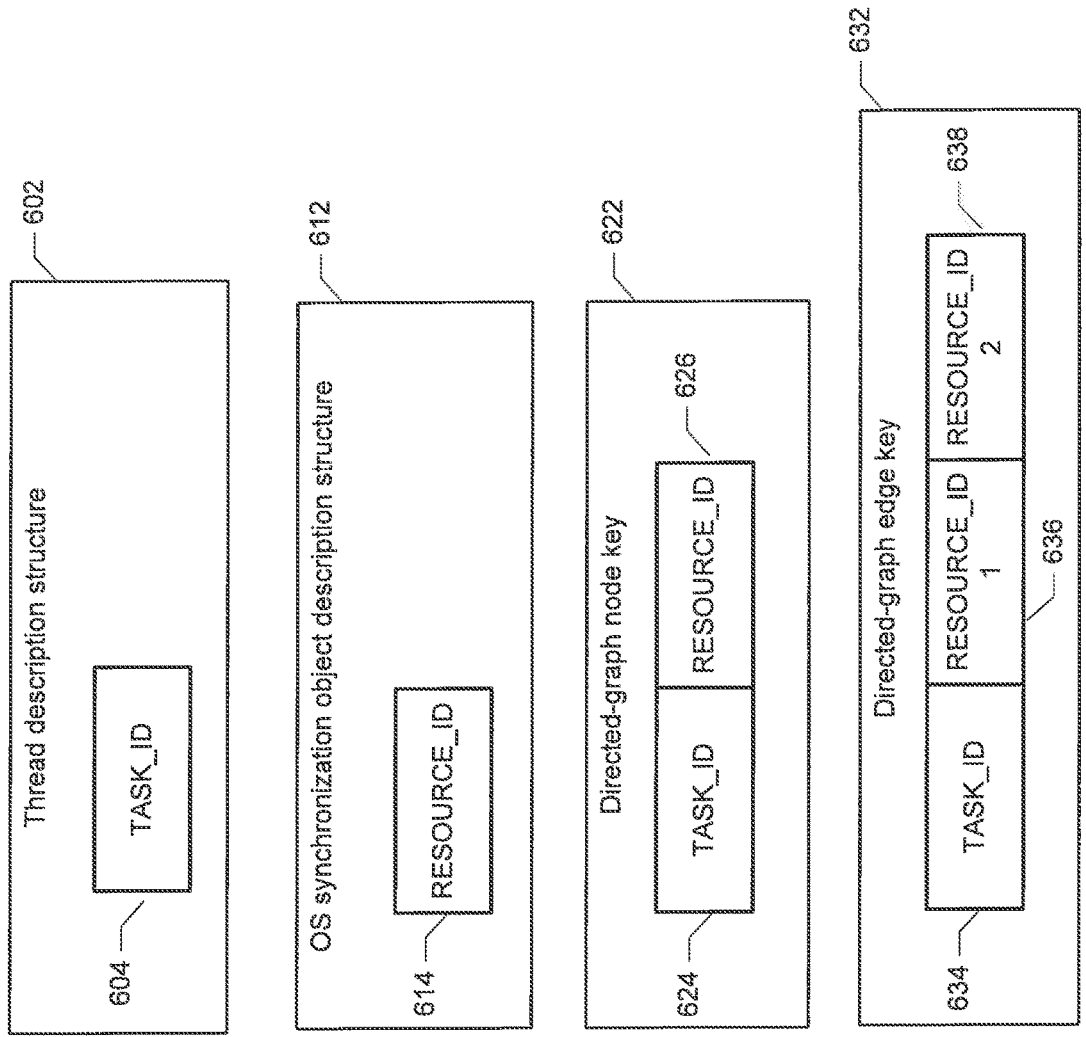
FIG. 6 is a block diagram of illustrative data structures of a performance snapshot in accordance with an illustrative embodiment.

Referring to FIG. 6, illustrative data structures employed to track the performance of storage system 100 are shown. As shown, thread description structure 602 may include an associated TASK_ID 604. OS synchronization object description structure 612 may include an associated RESOURCE_ID 614. Directed-graph node key 622 may include an associated TASK_ID 624 and an associated RESOURCE_ID 626, and directed-graph edge key 632 may include an associated TASK_ID 634, an associated first RESOURCE_ID 636, and an associated second RESOURCE_ID 638 that define the sequence of instructions between two resource nodes of the directed-graph. In some implementations, performance data counters are collected for each graph node and for each graph edge.

Figure 7:
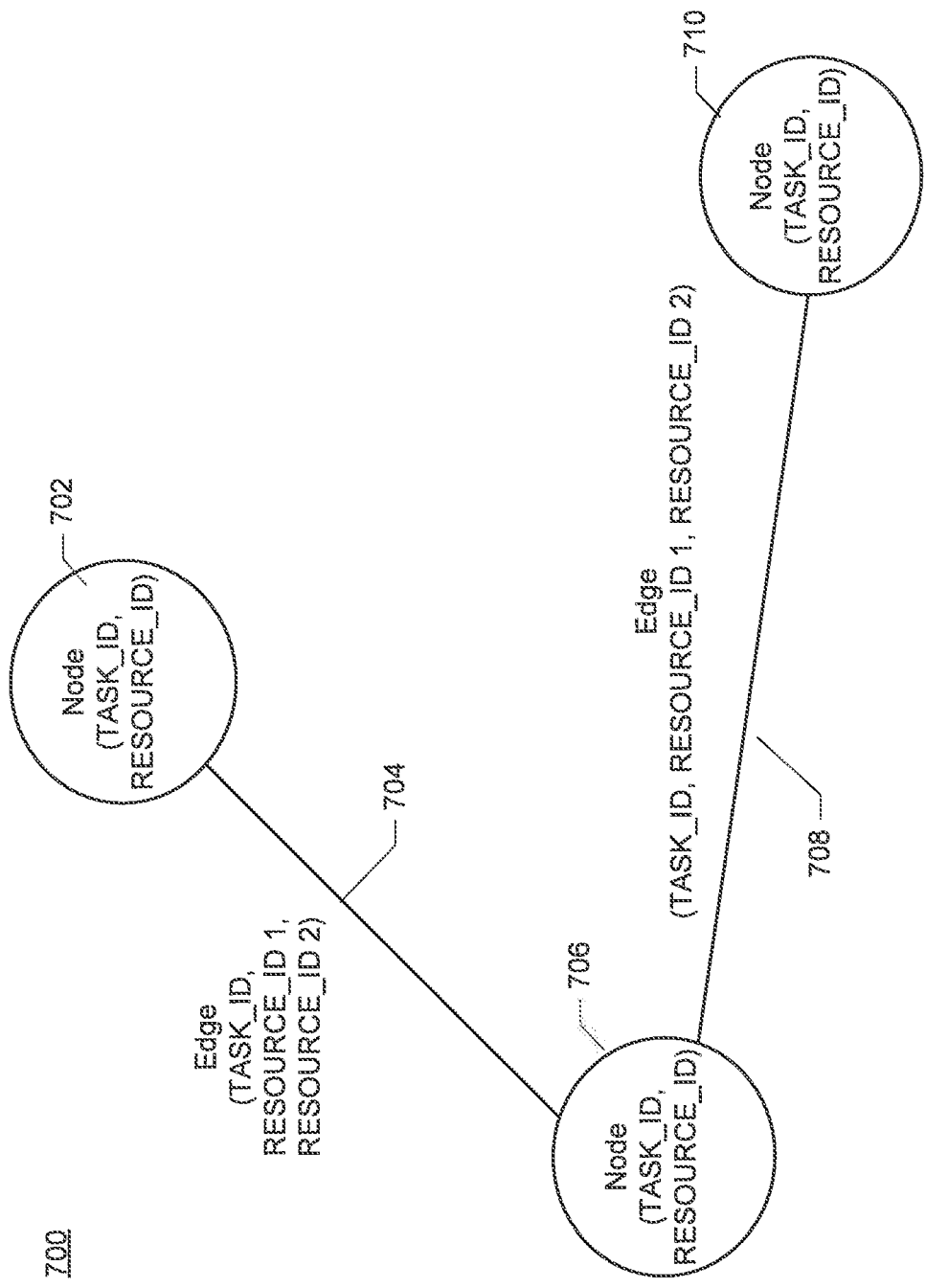
FIG. 7 is an illustrative task-specific directed-graph showing performance of the storage system in accordance with an illustrative embodiment.

Referring to FIG. 7, an illustrative directed-graph 700 is shown. As shown in FIG. 7, directed-graph 700 may include one or mode nodes, for example shown as nodes 702, 706, and 710. Each of nodes 702, 706, and 710 may have an associated key (e.g., 622 of FIG. 6) that is based upon a TASK_ID and RESOURCE_ID associated with the given node. As shown, two nodes may be joined by an associated edge, such as edges 704 and 708. In some implementations, each of edges 704 and 708 has an associated key (e.g., 632 of FIG. 6) that is based upon a TASK_ID, a first RESOURCE_ID, and a second RESOURCE_ID associated with the given node.

In described embodiments, threads may be in one of three main operating states: RUNNING, READY, or SUSPENDED. The RUNNING operating state indicates that the thread is presently running, while the READY operating state indicates that the thread is ready to be performed, but is waiting for processor resources to be available, and the SUSPENDED operating state indicates that the thread is stopped (e.g., suspended) at a synchronization object.

Described embodiments may update the one or more performance counters when a thread transitions between operating states.

Described embodiments may collect application level performance data without much instrumentation (e.g., low-impact) by employing the performance counters. In accordance with the present example, performance counters are updated based upon operating state transitions of given threads, such that updating the performance counters may not require much system resources or complex tracking mechanisms. Further, described embodiments provide for performance tracking functionality that may be upgradable with versions of software operating on storage system 100. For example, the one or more performance counters may be implemented in a thread scheduler operating in storage system 100 (e.g., in one of processors). In some implementations, performance counters may be accomplished by introducing new TASK IDs and new RESORCE_IDs into the system as part of the thread creation or resource utilization. These new IDs may then be automatically included into the performance tracking system.

The one or more performance counters collected for each performance data container may vary based upon a setup of storage system 100. Some embodiments may employ performance counters to collect data for each directed-graph node, and the performance counters may include counters for accumulating a number of accesses, accumulating a number of requested units (for cases when a single access contains a batch of requested units (e.g., data blocks)), accumulating suspended time, determining an average number of suspended requests, and other data. Some embodiments may employ additional performance counters to collect data for each directed-graph edge, and the performance counters may include counters for accumulating a number of passes (e.g., a number of times a given sequence of instructions have been performed), accumulating a run time (e.g., a time in the RUNNING state), accumulating a time in the READY state, accumulating a number of cooperative yields (e.g., a number of times one thread has yielded a resource to another thread), and other data.

Described embodiments may track performance of storage system 100 by periodically generating a snapshot of the performance counters. In some embodiments, a snapshot mechanism may be implemented by an independent OS process (e.g., a process operating concurrently with other OS processes of storage system 100). For example, in an illustrative embodiment, the snapshot mechanism may operate as described in U.S. Pat. No. 9,141,290, filed May 13, 2012, entitled "Snapshot Mechanism," assigned to EMC Corporation, the teachings of which are incorporated by reference herein in their entirety. The snapshot process may utilize processor and storage resources that are not associated with high-performance flows. In other words, the snapshot process may be performed as a background and/or low-priority process of storage system 100. A snapshot interval (e.g., how frequently the snapshot process is performed) may be a tradeoff between the time-precision of the performance tracking and the system resources consumed by generating snapshots. In some embodiments, the snapshot interval may be a value set by a user of storage system 100. In some embodiments, the snapshot interval may be dynamically adjusted by storage system 100 based upon one or more operating conditions of the storage system (e.g., availability of processor 105 and/or 133, available space of storage 108 and/or 137, etc.).

Performance data containers may be identified by unique keys. In described embodiments, the keys may be based upon a globally (e.g., within storage system 100) unique task identifier (TASK_D) associated with the task, and a globally unique resource identifier (RESOURCE_ID) associated with a resource associated with the task. For example, a thread description structure associated with each unique thread may include a field indicating the TASK_ID associated with the given thread. Similarly, each OS synchronization object (e.g., synchronization objects 376 and/or 381 of FIG. 3C) may have an associated description structure that may include a field indicating the RESOURCE_ID of the given synchronization object.

The keys for the directed-graph nodes may be two-tuples based upon the corresponding TASK_ID and RESOURCE_ID, and the keys for the directed-graph edges (e.g., sequences of processor instructions between two nodes) may be three-tuples based upon the TASK_ID and the RESOURCE_IDs for each of the two nodes that define the given edge.

Referring back to FIG. 4, a flow diagram of an illustrative process for operating storage system 100 of FIG. 1 is shown as process 400. At block 402, process 400 starts, for example when storage system 100 is powered on. At block 404, storage system 100 initializes one or more resource-specific performance counters and one or more application-specific performance counters to track performance of storage system 100. At block 406, storage system 100 generates one or more threads to operate the storage system. At block 408, storage system 100 monitors a state of each thread (e.g., RUNNING, READY, or SUSPENDED). At block 410, if the state of a given thread has changed, then at block 412, the performance counters of storage system 100 may be updated.

Process 400 returns to block 406 as threads are created and processed to operate storage system 100. If, at block 410, the state of a given thread has not changed, then process 400 returns to block 408.

As indicated by the dashed line, snapshot process 414 may be performed concurrently with (e.g., in parallel with) blocks 406, 408, 410, and 412 of process 400. At block 416, a snapshot interval may be started for generating a snapshot of the performance data. If, at block 418, the snapshot interval is complete, then at block 420, a snapshot of the performance data may be generated. Block 420 is described in greater detail in regard to FIG. 5. Snapshot process 414 returns to block 416 to begin a subsequent snapshot interval. Processes 400 and 414 may continue to operate until storage system 100 is powered off.

Figure 5:
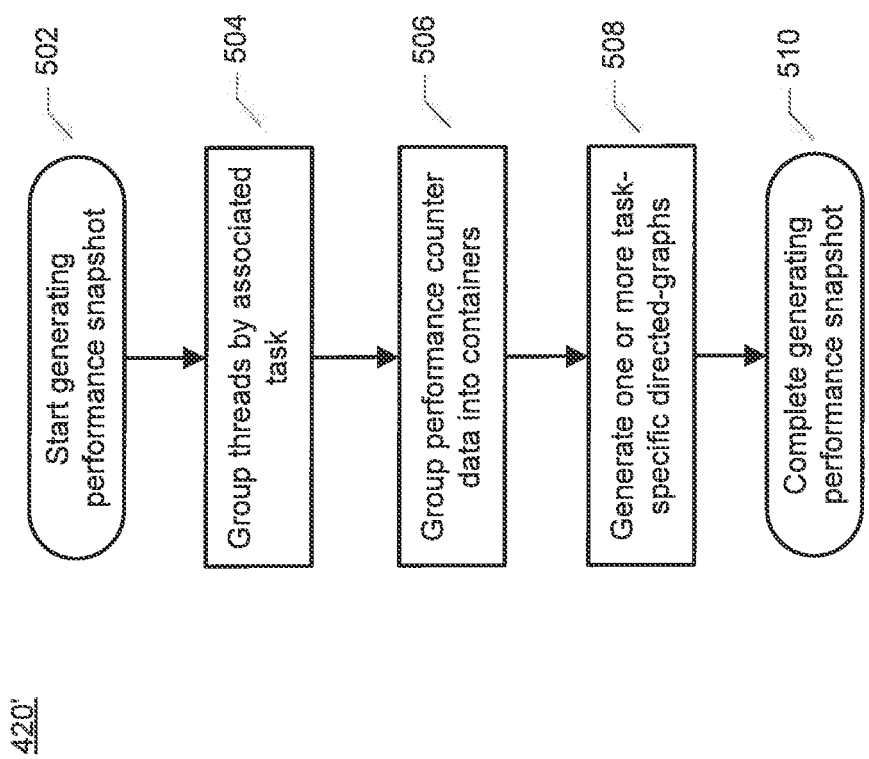
FIG. 5 is a flow diagram of an example of a process to generate a performance snapshot in accordance with an illustrative embodiment.

FIG. 5 shows additional detail of block 420 of FIG. 4 for generating a snapshot of the performance data, shown as process 420'. As shown in FIG. 5, process 420' may start at block 502. At block 504, storage system 100 may group one or more threads by a task associated with each thread. At block 506, performance data is grouped into one or more related performance data containers. For example, as described herein, a performance data container may be associated with an OS synchronization object. At block 508, one or more task-specific directed-graphs may be generated and provided to a user of storage system 100. At block 510, process 420' completes.

Figure 8:
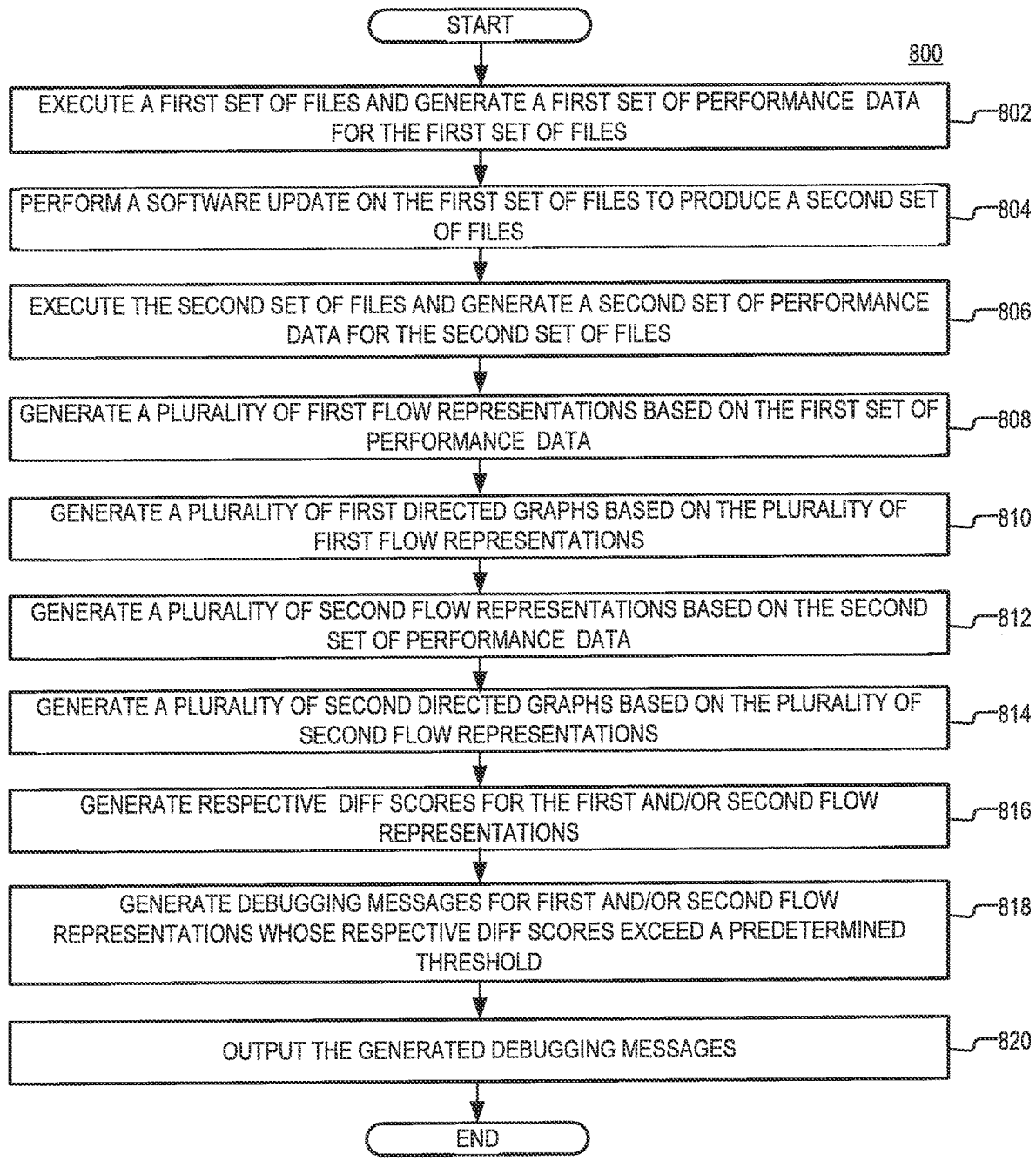
FIG. 8 is a flowchart of an example of a process, according to aspects of the disclosure.

FIG. 8 is a flowchart of an example of a process 800 for detecting performance degradation caused by a software update and identifying specific reasons for the performance degradation, according to aspects of the disclosure.

At step 802, a first set of files is executed, and a first set of performance data is generated for the first set of files. The first set of files may include any number of files, such as one file or a plurality of files. The performance data may be collected as discussed above with respect to FIGS. 4 and 5.

At step 804, a software update is performed on the first set of files to produce a second set of files. In some implementations, updating the first set of files may include replacing at least one of the files with a new version of the same file. Additionally or alternatively, in some implementations, updating the first set of files may include patching at least one of the files in the first set. In this regard, in some implementations, the second set of files may be identical to the first set of files, but for including at least one file that is a newer version (or a patched version) of a file found in the first set.

At step 806, the second set of files is executed, and a second set of performance data is generated for the second set of files. The performance data may be collected as discussed above with respect to FIGS. 4 and 5.

At step 808, a plurality of first flow representations is generated. According to aspects of the disclosure, each first flow representation may include one or more performance data containers that contain a portion (or a subset) of the performance data collected at step 802. Each first flow representation may be associated with a set of threads that have the same entry function, and/or the same opcode. In some implementations, the threads in the set may have the same TASK_ID. The TASK_ID of the set of threads may be based on the entry function (identifier) and/or opcode of the threads. In some implementations, each of the performance data containers that constitute a given first flow representation may also include (or be otherwise associated with) the TASK_ID of the set of threads that are associated with the given flow representation.

In some implementations, the performance data containers that constitute a given flow representation may include one or more types of performance data. The performance data may be collected using performance counters in the manner discussed with respect to FIGS. 1-7. As noted above, while a given thread is executing, each performance counter may collect performance data and store the collected data in one or more performance data containers that are associated with the same TASK_ID as the given thread. As a result of this arrangement, the performance data in any of the performance data containers that constitute a given first flow representation may include only data related to the utilization (or consumption) of resources by a set of one or more threads that have the same entry function and/or opcode, and are associated with the same TASK_ID as the performance data containers.

The performance data in any given first flow representation, may include statistical information for a particular resource. The resource may be a hardware resource, such as processor time, memory, network bandwidth, etc. Additionally or alternatively, the resource may be a software resource, such as a synchronization object, or a processing sequence. As used throughout the disclosure, the term "utilization rate" of a particular may refer to any suitable measure of the extent to which a particular resource is utilized. For example, the utilization rate of a processing sequence may include an indication of the number of times the sequence is executed during a particular time window, the amount of time spent in a waiting or suspended state by the sequence, etc. As another example, the utilization rate of a synchronization object may be the number of accesses to the synchronization object during a particular time window, etc.

In some implementations, the performance data in any given first flow representation may be organized in slices. A slice, according to the present example, may be a number, a string, an alphanumerical string, and/or any other suitable representation that identifies the utilization rate of a particular resource (or multiple resources) during a given time window. In some implementations, the time window may be 100 milliseconds long. By way of example, each slice of the performance data may identify the average utilization rate of a CPU during a different time window. As another example, each slice of the performance data may identify the number of accesses of a synchronization object during a different time window. As is further discussed below, organizing the performance data in a given flow representation in slices may permit different flow representations to be compared to one another.

At step 810, a plurality of first directed graphs is generated for the plurality of first flow representations. Each first directed graph may be generated based on a different one of the first flow representations. As noted above, each first directed graph may include a plurality of first nodes connected by first edges. In some implementations, each first node may represent a different synchronization object, and each first edge that directly connects two first nodes may represent a different processing sequence of processor-executable instructions (that are part of one or more threads associated with the first flow), which are executed between consecutive accesses of the respective synchronization objects that are represented by the two first nodes. For example, when a given thread is executed, it may continue executing until it reaches a point at which the given thread performs an access of a synchronization object. At this point, the thread is suspended while the access to the synchronization object is pending, and another thread begins executing until the other thread also performs an access of another synchronization object. According to this example, each of the synchronization object may be represented by a different node in the first directed graph and the processor-executable instructions that are executed after one of the synchronization objects is accessed and before (or until) the other of the synchronization objects is accessed may be represented by an edge spanning between (e.g., directly connecting) the nodes representing the synchronization objects.

In some implementations, each first directed graph may be generated in the manner discussed above with respect to FIGS. 4-7.

At step 812, a plurality of second flow representations is generated. According to aspects of the disclosure, each second flow representation may include one or more performance data containers that contain a portion (or a subset) of the performance data collected at step 806. Each second flow representation may be associated with a set of threads that have the same entry function, and/or the same opcode. In some implementations, the threads in the set may have the same TASK_ID. The TASK_ID of the set of threads may be based on the entry function (identifier) and/or opcode of the threads. In some implementations, each of the performance data containers that constitute a given second flow representation may also include (or be otherwise associated with) the TASK_ID of the set of threads that are associated with the given flow representation.

In some implementations, the performance data containers that constitute a given flow representation may include one or more types of performance data. The performance data may be collected using performance counters in the manner discussed with respect to FIGS. 1-7. As noted above, while a given thread is executing, each performance counter may collect performance data and store the collected data in one or more performance data containers that are associated with the same TASK_ID as the given thread. As a result of this arrangement, the performance data in any of the performance data containers that constitute a given second flow representation may include only data related to the utilization (or consumption) of resources by a set of one or more threads that have the same entry function and/or opcode, and are associated with the same TASK_ID as the performance data containers. The performance data in any given second flow representation, may include statistical information for a particular resource. The resource may be a hardware resource, such as processor time, memory, network bandwidth, etc. Additionally or alternatively, the resource may be a software resource, such as a synchronization object, or a processing sequence.

At step 814, a plurality of second directed graphs is generated for the plurality of second flow representations. Each second directed graph may be generated based on a different one of the second flow representations. As noted above, the second directed graph may include a plurality of second nodes connected by second edges. In some implementations, each second node may represent a different synchronization object, and each second edge that directly connects two second nodes may represent a different processing sequence of processor-executable instructions (that are part of one or more threads associated with the second flow), which are executed between consecutive accesses of the respective synchronization objects that are represented by the two second nodes.

At step 816, the first flow representations and the second flow representations are processed and respective DIFF scores are calculated for the first flow and/or second flow representations. In some implementations, the DIFF score for a given first flow representation may be a score that indicates whether the given first flow representation has a matching counterpart in the plurality of second flow representations. In some implementations, the DIFF score for a given second flow representation may be a score that indicates whether the given second flow representation has a matching counterpart in the plurality of first flow representations. Additionally or alternatively, in some implementations, the DIFF score for a given first flow representation may be generated by comparing the first flow representation to a second flow representation that is a matching counterpart of the first flow representation. Alternatively, the DIFF score for a given second flow representation may be generated by comparing the second flow representation to a second flow representation that is matching counterpart of the second flow representation.

In some implementations, a given first flow representation and a given second flow representation may be matching counterparts when the given first flow representation is associated with a first set of threads and the given second flow representation is associated with a second set of threads, such that the threads in the first set have the same (or similar) entry function as the threads in the second set. Additionally or alternatively, in some implementations, a given first flow representation and a given second flow representation may be matching counterparts when the given first flow representation is associated with a first set of threads and the given second flow representation is associated with a second set of threads, such that the threads in the first set have the same (or similar) opcode as the threads in the second set. Additionally or alternatively, in some implementations, a given first flow representation and a given second flow representation may be matching counterparts when the given first flow representation is associated with a first set of threads and the given second flow representation is associated with a second set of threads, such that the threads in the first set have the same (or similar) TASK_ID as the threads in the second set. According to the present disclosure, a first flow representation and a second flow representation that are each other's matching counterpart may be referred to as a pair of matching flow representations.

In some implementations, a pair of matching flow representations may include a first flow representation that is associated with a first set of threads, and a second flow representation that is associated with a second set of threads. In such instances, the first set of threads and the second set of threads may be instantiated using the same body of code before and after the software update performed at step 804 is completed. In other words, each thread in the first set may be an instance of the same thread as a different one of the threads in the second set. However, because of the software update, at least one of the threads in the second set may include one or more processor-executable instructions that are introduced by the software update and not found in the first set of threads. In this regard, the DIFF score for the pair of matching flow representations may measure the similarity in resource consumption between the first set of threads and the second set of threads, and it can be used to detect any increase in resource consumption resulting from the software update.

At step 818, one or more debugging messages are generated based on the respective DIFF scores that are calculated. More particularly, at step 818, one or more first and/or second flows are identified whose DIFF scores (or absolute values thereof) exceed a predetermined threshold. Afterwards, one or more debugging messages are generated for the identified flows. The debugging messages may identify one or more of the flows whose DIFF scores (or absolute values thereof) exceed the predetermined threshold, threads associated with the flows, and/or specific resource utilization data associated with the flows. The manner in which the debugging messages are generated is further discussed with respect to FIGS. 12 and 13.

At step 820, the one or more debugging messages are output for presentation to a user. In some implementations, outputting the debugging messages may include displaying the debugging messages on a display screen. In some implementations, any of the debugging messages may include one or more of a text, an image, a video, a sound, and/or any other suitable type of information that can be used to debug first set of files and/or the second set of files. According to aspects of the disclosure, the debugging message may be useful in situations when the software update is performed at step 804 results in an increase in resource consumption by the updated files and a degradation of system performance. In such situations, the debugging message may be used to debug the software update to improve its efficiency and/or remove software bugs that caused the degradation of system performance.

Figure 9:
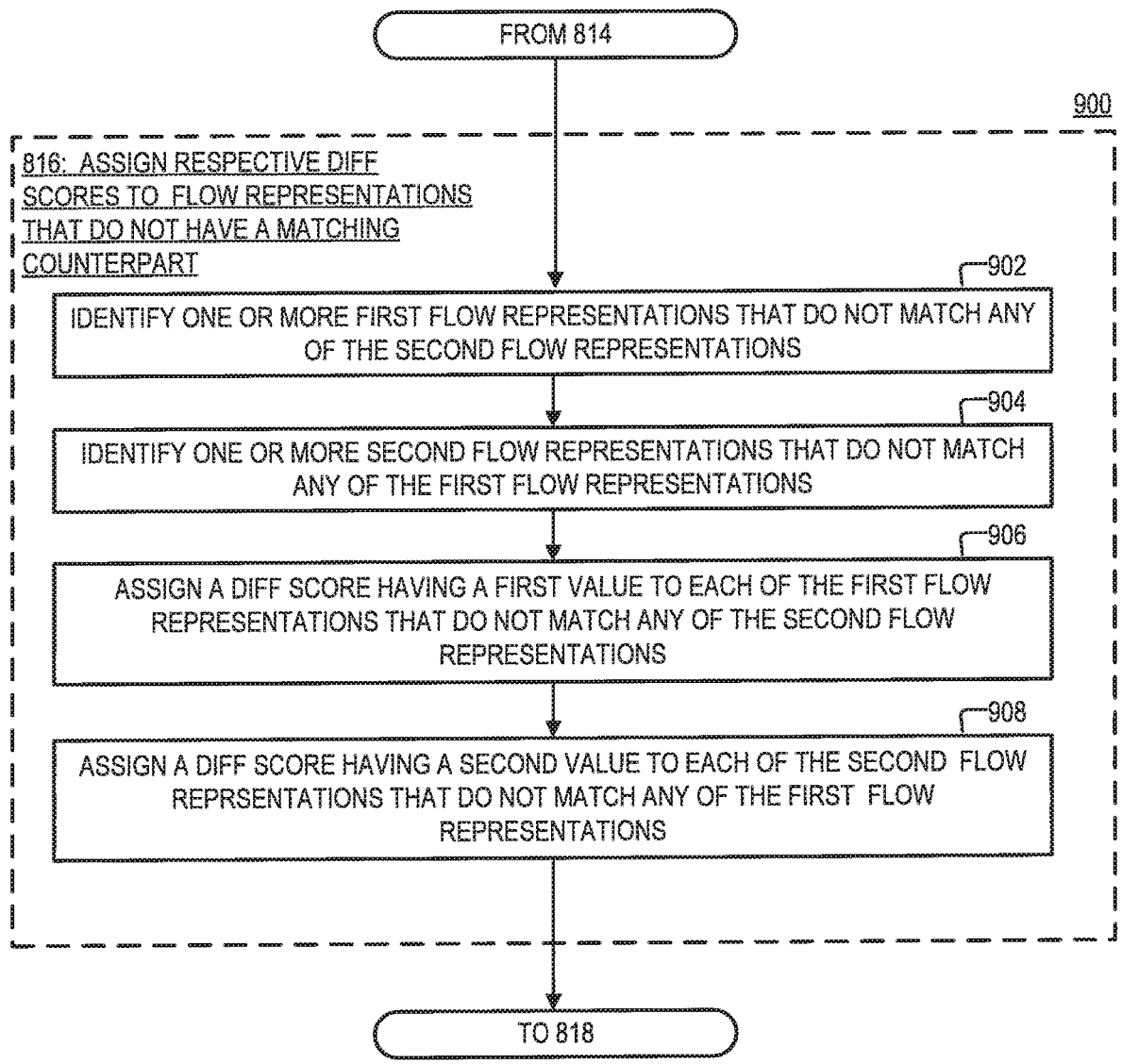
FIG. 9 is a flowchart of an example of a sub-process associated with the process of FIG. 8, according to aspects of the disclosure.
Figure 10:
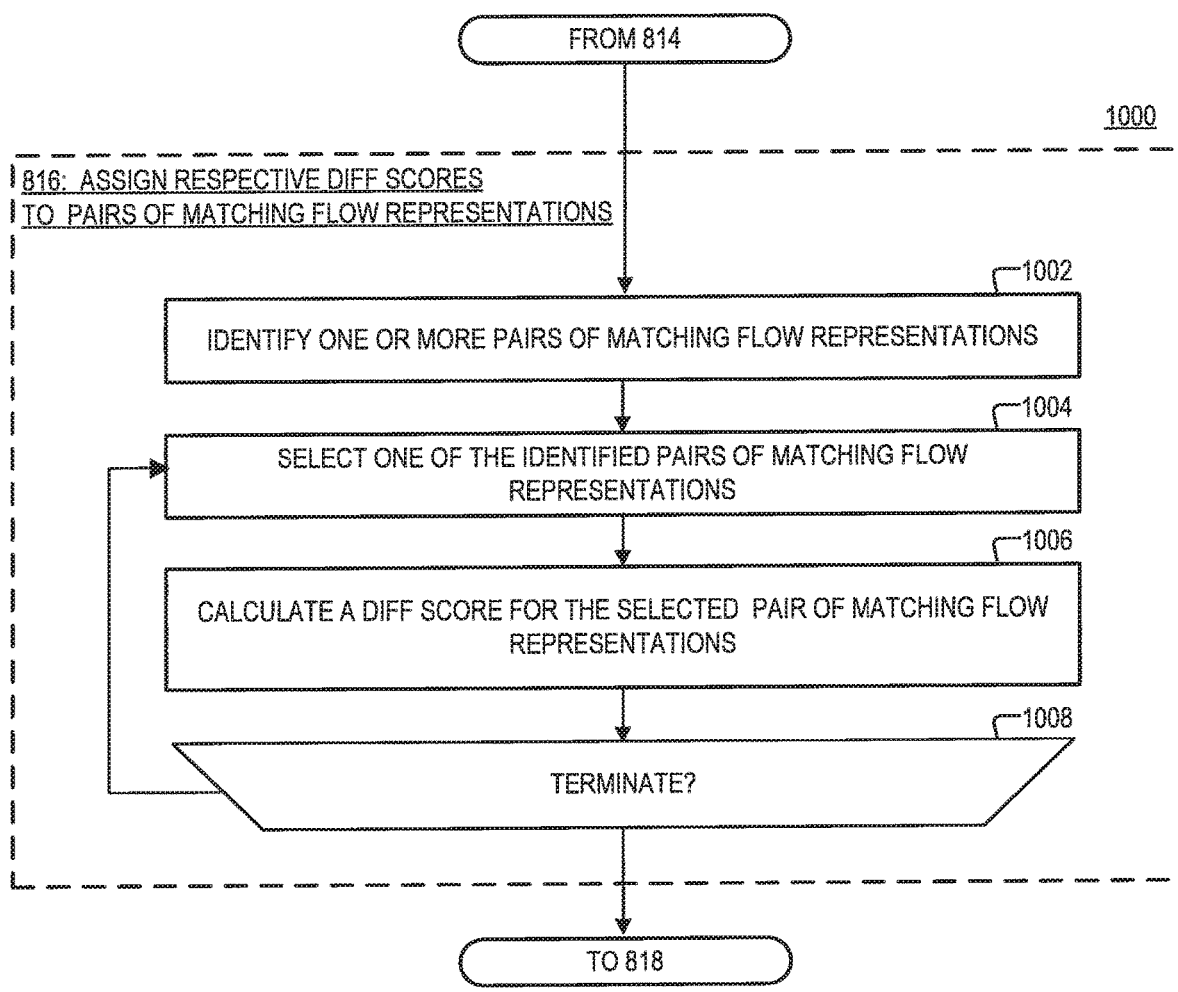
FIG. 10 is a flowchart of an example of a sub-process associated with the process of FIG. 8, according to aspects of the disclosure.
Figure 11:
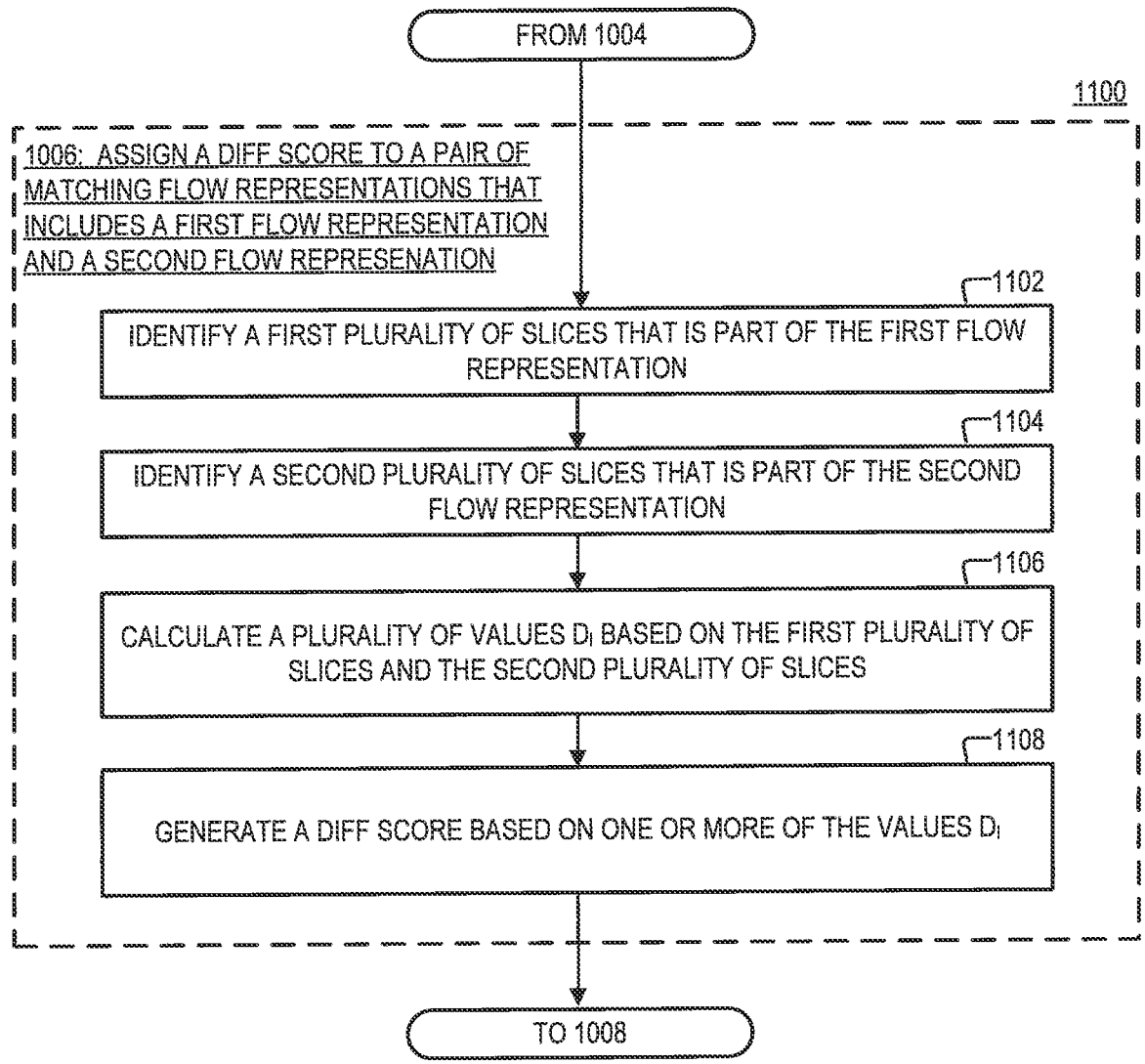
FIG. 11 is a flowchart of an example of a sub-process associated with the process of FIG. 8, according to aspects of the disclosure.

FIG. 9-11 provide an example of a process for calculating a respective DIFF score for the plurality of first flow representations and the plurality of second flow representations, as specified by step 816 of the process 800. According to aspects of the disclosure, the DIFF score for any flow representation may be a number having a lower bound (e.g., −2) and an upper bound (e.g., +2). When a first flow representation does not have a matching second flow representation counterpart, the DIFF score for that first flow representation may be assigned a value equal to the lower bound of the DIFF score range (e.g., −2). When a second flow representation does not have a matching second flow representation counterpart, the DIFF score for that second flow representation may be assigned a value equal to the upper bound of the DIFF score range (e.g., +2). When a first flow representation has a second flow representation counterpart, both flow representations are assigned a DIFF score that falls somewhere between the lower bound and the upper bound of the DIFF score range. The DIFF score for any pair of matching of flow representations may be calculated by comparing the two flow representations to one another, as described further below with respect to FIG. 11.

FIG. 9 is a flowchart of a process for calculating DIFF scores for any of the first flow representations and the second flow representations, as specified by step 816 of the process 800. At step 902, the plurality of first flow representations and the plurality of second flow representations are processed to identify one or more first flow representations that do not have a matching counterpart in the plurality of second flow representations. At step 904, the plurality of first flow representations and the plurality of second flow representations are processed to identify one or more second flow representations that do not have a matching counterpart in the plurality of first flow representations. At step 906, a minimum DIFF score value (e.g., −2) is assigned to each of the first flow representations that do not have a matching second flow representation counterpart. At step 908, a maximum DIFF value (e.g., +2) is assigned to each of the second flow representations that do not have a matching first flow representation counterpart.

FIG. 10 is a flowchart of a process for calculating DIFF scores for any of the first flows and the second flows, as specified by step 816 in the process 800. At step 1002, one or more pairs of matching flow representations are identified. Each pair of matching flow representations may include one of the plurality of first flow representations that are generated at step 808 and one of the plurality of second flow representations that are generated at step 812 that matches the first flow representation. At step 1004, one of the plurality of pairs is selected. At step 1006, a DIFF score is assigned to the selected pair of matching flow representations. The manner in which the DIFF score for each selected pair is calculated is discussed further below with respect to FIG. 11. At step 1008, a determination is made if there are any pairs of matching flow representations that remain to be processed. If there are one or more pairs of matching flow representations that remain to be processed, the process 1000 returns to step 1004. If there are no more pairs of matching flow representations that remain to be processed, the process 1000 ends.

FIG. 11 is a flowchart of an example of a process for calculating the DIFF score for a pair of matching flow representations that includes a first flow representation and a second flow representation, as specified by step 1006 of the process 1000.

At step 1102, a first plurality of slices is identified that is part of the first flow representation.

At step 1104, a second plurality of slices is identified that is part of the second flow representation.

At step 1106, a plurality of values $D_i$ is calculated, in accordance with equation 1 below:

$$D_i = 2\left(\frac{A_i - B_i}{A_i + B_i}\right), \quad \text{(Eq. 1)}$$

where $A_i$ is the i-th slice in the first flow representation, and $B_i$ is the i-th slice in the second flow representation. As can be readily appreciated, each value $D_i$ is a "is a difference over average" value, and it represents change as a percentage of the absolute value, which is more informative with respect to the significance of the change.

At step 1108, a DIFF score for the pair of matching flow representations is determined based on one or more values $D_i$. In some implementations, the DIFF score may be equal to the largest value $D_i$. Additionally or alternatively, in some implementations, the DIFF score may be equal to the average (and/or median) of all values $D_i$. The present disclosure is not limited to any specific way of calculating the DIFF score based on one or more values $D_i$.

Figure 12:
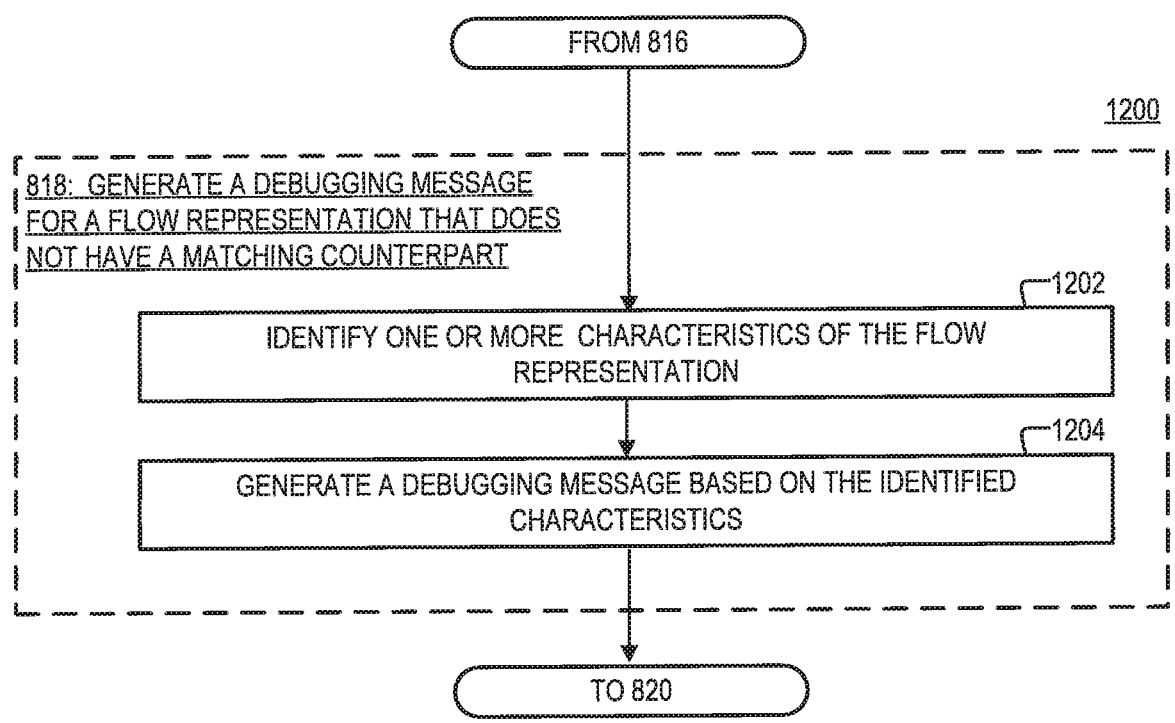
FIG. 12 is a flowchart of an example of a sub-process associated with the process of FIG. 8, according to aspects of the disclosure.

FIG. 12 is a flowchart of an example of a process for generating a debugging message corresponding to a flow representation that does not have a matching counterpart, as specified by step 818 of the process 800. At step 1202 one or more characteristics of the flow representation are identified. By way of example, the characteristics may include one or more of (i) identifier(s) for one or more threads that are associated with the flow representation, (ii) identifier(s) for one or more files that are used to instantiate the threads, and (iii) an identifier of an application-level task that is performed when the threads are executed. At step 1204 a debugging message is generated that indicates that the installation of the software update at step 804 has caused a change in the execution flow of the updated set of files. In some implementations, the debugging message may include an indication of the identified characteristics. In some implementations, the message may include text, an image, a sound, a video, an animation, and/or any suitable type of media.

Figure 13:
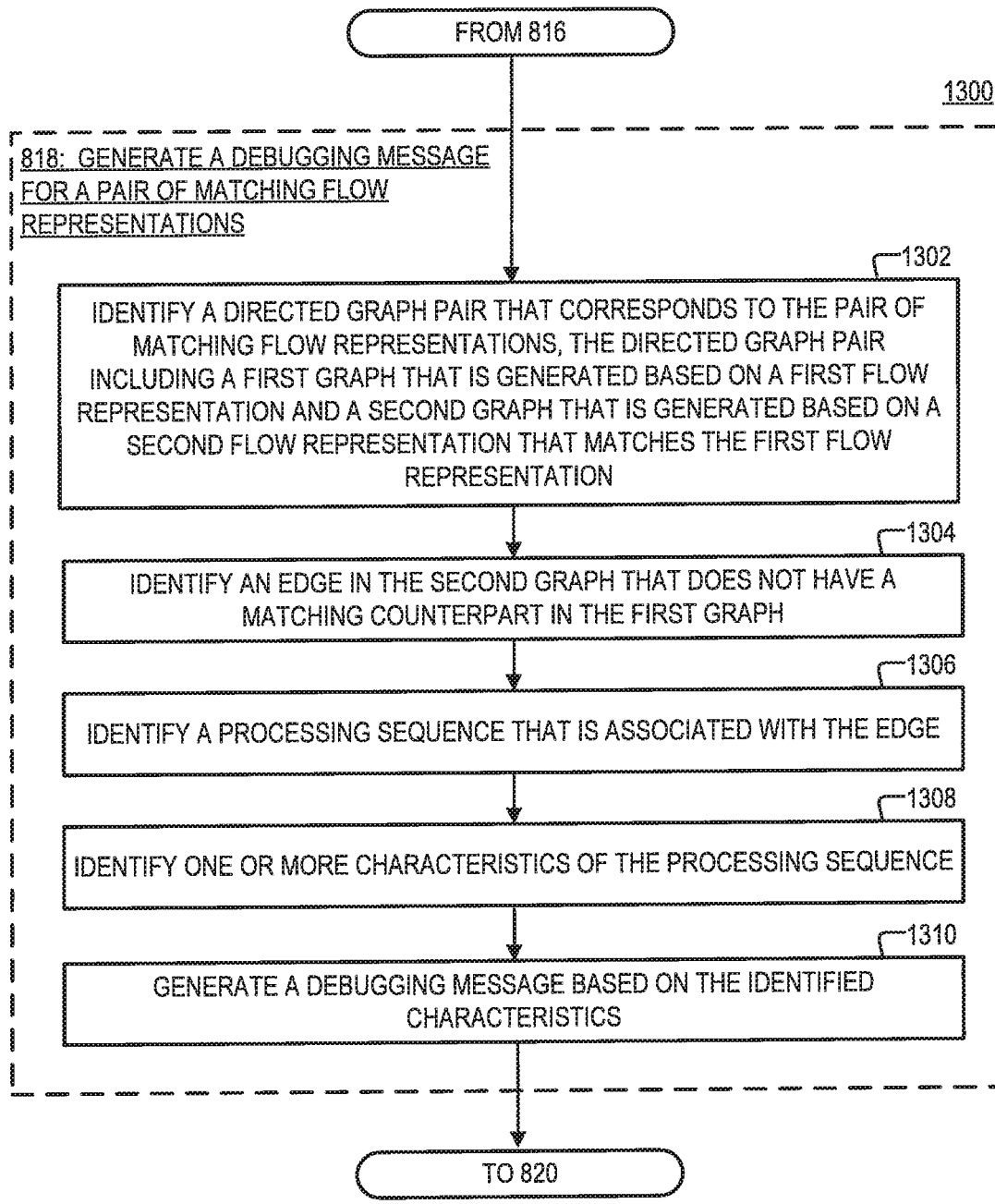
FIG. 13 is a flowchart of an example of a sub-process associated with the process of FIG. 8, according to aspects of the disclosure.

FIG. 13 is a flowchart of an example of a process for generating a debugging message for a pair of matching flow representations that includes a first flow representation and a second flow representation that matches the first flow representation, as specified by step 818 of the process 800. At step 1302, a pair of directed graphs is identified that includes a first directed graph and a second directed graph. The first directed graph is generated based on the first flow representation and the second directed graph is generated based on the second flow representation. At step 1304, the first directed graph in the pair and the second directed graph in the pair are compared to one another to identify an edge in the second directed graph that does not have a matching counterpart in the second graph. In some implementations, the identified edge may be one that connects two nodes that are not directly connected in the first graph by any of the edges in the first graph. Additionally or alternatively, the identified edge may be one that forms an extra connection, in excess of any other connections that are already present in the first graph. For example, if the first graph includes five edges that connect a pair of first nodes, and the second graph includes six edges that connect a pair of second nodes that correspond to the pair of first nodes, the sixth edge in the second graph may be regarded as one that does not have a matching counterpart in the first graph. At step 1306, a processing sequence associated with the edge is identified. At step 1308 one or more characteristics of the processing sequence are identified. By way of example, the characteristics may include: (i) identifier(s) corresponding to one or more processor-executable instructions that make up the sequence, (ii) identifier(s) of one or more threads that make up the processing sequence, or (iii) identifier(s) of one or more files that were used to instantiate the threads. At step 1310, a message is generated that indicates that the installation of the software update at step 804 has caused a change in the execution flow of the updated set of files (i.e., the second set of files). In some implementations, the debugging message may include an indication of any of the identified characteristics. Additionally or alternatively, the debugging message may identify a resource whose utilization rate has increased as a result of the software update performed at step 804 (e.g., a resource for which a DIFF score exceeds a predetermined threshold). In some implementations, the message may include text, an image, a sound, a video, an animation, and/or any suitable type of media. Stated succinctly, according to aspects of the disclosure, the first and second directed graphs for a pair of matching flow representations may be used to detect changes in the execution flow of the updated files that result from the software update being performed at step 804. Providing information about such changes in the debugging message may help software developers to debug the software update to improve its efficiency and/or remove software bugs that have caused increased resource consumption and/or degradation in system performance.

Figure 14:
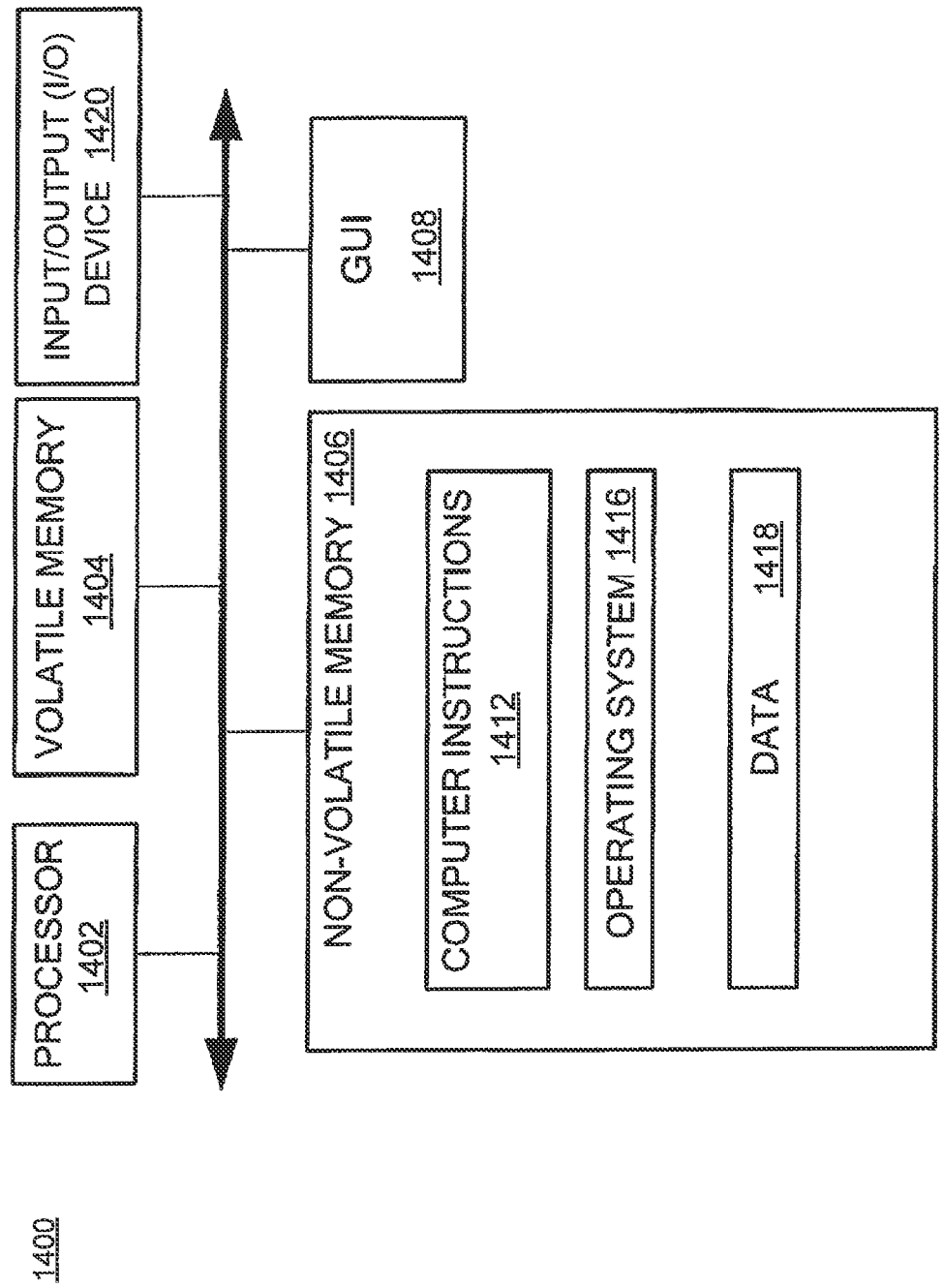
FIG. 14 is a block diagram of an example of a hardware device that may perform at least a portion of the processes in FIGS. 4 and 5.

Referring to FIG. 14, in some embodiments, source site 102 and/or target site 112 may be implemented as one or more computers. Computer 1400 may include processor 1402, volatile memory 1404 (e.g., RAM), non-volatile memory 1406 (e.g., a hard disk drive, a solid state drive such as a flash drive, a hybrid magnetic and solid state drive, etc.), graphical user interface (GUI) 408 (e.g., a touchscreen, a display, and so forth) and input/output (I/O) device 1420 (e.g., a mouse, a keyboard, etc.). Non-volatile memory 1406 stores computer instructions 1412, an operating system 1416 and data 818 such that, for example, the computer instructions 1412 are executed by the processor 802 out of volatile memory 1404 to perform at least a portion of processes 400 and 420' (FIGS. 4 and 5). Program code may be applied to data entered using an input device of GUI 1408 or received from I/O device 1420.

Processes 400 and 420' (FIGS. 4 and 5) are not limited to use with the hardware and software of FIG. 14 and may find applicability in any computing or processing environment and with any type of machine or set of machines that may be capable of running a computer program. Processes 400 and 420' (FIGS. 4 and 5) may be implemented in hardware, software, or a combination of the two.

The processes described herein are not limited to the specific embodiments described. For example, processes 400 and 420' are not limited to the specific processing order shown in FIGS. 4 and 5. Rather, any of the blocks of processes 400 and 420' may be re-ordered, combined or removed, performed in parallel or in serial, as necessary, to achieve the results set forth herein.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:
1. A method comprising:
    executing a first set of files on a computing system, and collecting a first set of performance data based on the executing of the first set of files;
    performing a software update on the first set of files to produce a second set of files;

executing the second set of files on the computing system
and collecting a second set of performance data based
on the executing of the second set of files;
identifying a first subset of the first set of performance
data, the first subset corresponding to an execution of
one or more first thread instances, the first thread
instances being instantiated using the first set of files;
identifying a second subset of the second set of performance data, the second subset corresponding to an
execution of one or more second thread instances, the
second thread instances being instantiated using the
second set of files;
calculating a score based on the first subset and the second
subset, the score indicating a difference in resource
consumption between the first thread instances and the
second thread instances; and
generating and outputting a debugging message based on
the score,
wherein the first thread instances and the second thread
instances have at least one of the same entry function
and the same opcode, and
wherein the first subset includes a plurality of first slices
of performance data arranged in a first order, the second
subset includes a plurality of second slices of performance data arranged in a second order, and the score is
generated based on a difference between least one first
slice and at least one second slice that have matching
positions in the first order and the second order, respectively.

2. The method of claim 1, wherein the difference includes a difference over average.

3. The method of claim 1, wherein the debugging message is generated only when the score exceeds a threshold.

4. The method of claim 1, further comprising:
generating a first directed graph based on the first subset, the first directed graph including a plurality of first nodes and a plurality of first edges, each first node corresponding to a different one of a plurality of synchronization objects, and each first edge corresponding to a respective first sequence or processor-executable that are executed between consecutive accesses of any two of the plurality of synchronization objects;
generating a second directed graph based on the second subset, the second directed graph including a plurality of second nodes and a plurality of second edges, each second node corresponding to a different one of the plurality of synchronization objects, and each second edge corresponding to a respective second sequence or processor-executable that are executed between consecutive accesses of any two of the plurality of synchronization objects; and
identifying a second edge in the second directed graph that does not have a matching counterpart in the first directed graph,
wherein the debugging message identifies at least a portion of a second sequence of processor-executable instructions that corresponds to the identified second edge, and
wherein the plurality of synchronization objects is defined in both the first set of files and the second set of files.

5. The method of claim 1, wherein:
each of the first slices includes an indication of resource utilization during a respective time window in which one or more of the first thread instances are executed, and each of the second slices includes an indication of resource utilization during a respective time window in which one or more of the second thread instances are executed.

6. The method of claim 1, wherein each of the first slices and each of the second slices includes an indication of a utilization rate of a resource of the computing system.

7. The method of claim 1, wherein the first thread instances and the second thread instances are instantiated using the same body of processor-executable instructions before and after the body of processor executable instructions is updated.

8. An apparatus comprising:
one or more processors; and
a memory configured to store one or more processor executable instructions, which when executed by the one or more processors cause the one or more processors to perform a method comprising the steps of:
executing a first set of files, and collecting a first set of performance data based on the executing of the first set of files;
performing a software update on the first set of files to produce a second set of files;
executing the second set of files and collecting a second set of performance data based on the executing of the second set of files;
identifying a first subset of the first set of performance data, the first subset corresponding to an execution of one or more first thread instances, the first thread instances being instantiated using the first set of files;
identifying a second subset of the second set of performance data, the second subset corresponding to an execution of one or more second thread instances, the second thread instances being instantiated using the second set of files;
calculating a score based on the first subset and the second subset, the score indicating a difference in resource consumption between the first thread instances and the second thread instances; and
generating and outputting a debugging message based on the score,
wherein the first thread instances and the second thread instances have at least one of the same entry function and the same opcode, and
wherein the first thread instances and the second thread instances are both instances of a set of one or more threads that is defined in both the first set of files and the second set of files
wherein the first subset includes a plurality of first slices of performance data arranged in a first order, the second subset includes a plurality of second slices of performance data arranged in a second order, and the score is generated based on a difference between at least one first slice and at least one second slice that have matching positions in the first order and the second order, respectively.

9. The apparatus of claim 8, wherein the difference includes a difference over average.

10. The apparatus of claim 8, wherein the debugging message is generated only when the score exceeds a threshold.

11. The apparatus of claim 8, wherein the method further comprises:
generating a first directed graph based on the first subset, the first directed graph including a plurality of first nodes and a plurality of first edges, each first node corresponding to a different one of a plurality of synchronization objects, and each first edge corresponding to a respective first sequence or processor-executable that are executed between consecutive accesses of any two of the plurality of synchronization objects;

generating a second directed graph based on the second subset, the second directed graph including a plurality of second nodes and a plurality of second edges, each second node corresponding to a different one of the plurality of synchronization objects, and each second edge corresponding to a respective second sequence or processor-executable that are executed between consecutive accesses of any two of the plurality of synchronization objects; and identifying a second edge in the second directed graph that does not have a matching counterpart in the first directed graph, wherein the debugging message identifies at least a portion of a second sequence of processor-executable instructions that corresponds to the identified second edge, and wherein the plurality of synchronization objects is defined in both the first set of files and the second set of files.

12. The apparatus of claim 8, wherein:

each of the first slices includes an indication of resource utilization during a respective time window that overlaps with an execution of only one thread instance, and each of the second slices includes an indication of resource utilization during a respective time window that overlaps with an execution of only one thread instance.

13. The apparatus of claim 8, wherein each of the first slices and each of the second slices includes an indication of a utilization rate of a resource of the computing system.

14. The apparatus of claim 8, wherein the first thread instances and the second thread instances are instantiated using the same body of processor-executable instructions before and after the body of processor executable instructions is updated.

15. A non-transitory computer-readable medium configured to store one or more processor-executable instructions, which when executed by at least one processor cause the at least one processor to perform a method comprising the steps of:

executing a first set of files on a computing system, and collecting a first set of performance data based on the executing of the first set of files;

performing a software update on the first set of files to produce a second set of files;

executing the second set of files on the computing system and collecting a second set of performance data based on the executing of the second set of files;

identifying a first subset of the first set of performance data, the first subset corresponding to an execution of one or more first thread instances, the first thread instances being instantiated using the first set of files;

identifying a second subset of the second set of performance data, the second subset corresponding to an execution of one or more second thread instances, the second thread instances being instantiated using the second set of files;

calculating a score based on the first subset and the second subset, the score indicating a difference in resource consumption between the first thread instances and the second thread instances; and generating and outputting a debugging message based on the score, wherein the first thread instances and the second thread instances have at least one of the same entry function and the same opcode, and wherein the first subset includes only first slices that overlap with an execution of the first thread instances, and the second subset includes only second slices that overlap with an execution of the second thread instances.

16. The non-transitory computer-readable medium of claim 15, wherein the difference includes a difference over average.

17. The non-transitory computer-readable medium of claim 15, wherein the debugging message is generated only when the score exceeds a threshold.

18. The non-transitory computer-readable medium of claim 15, wherein the method further comprises the steps of:

generating a first directed graph based on the first subset, the first directed graph including a plurality of first nodes and a plurality of first edges, each first node corresponding to a different one of a plurality of synchronization objects, and each first edge corresponding to a respective first sequence or processor-executable that are executed between consecutive accesses of any two of the plurality of synchronization objects;

generating a second directed graph based on the second subset, the second directed graph including a plurality of second nodes and a plurality of second edges, each second node corresponding to a different one of the plurality of synchronization objects, and each second edge corresponding to a respective second sequence or processor-executable that are executed between consecutive accesses of any two of the plurality of synchronization objects; and identifying a second edge in the second directed graph that does not have a matching counterpart in the first directed graph, wherein the debugging message identifies at least a portion of a second sequence of processor-executable instructions that corresponds to the identified second edge, and wherein the plurality of synchronization objects is defined in both the first set of files and the second set of files.

19. The non-transitory computer-readable medium of claim 15, wherein:

each of the first slices includes an indication of resource utilization during a respective time window that overlaps with an execution of only one thread instance, and each of the second slices includes an indication of resource utilization during a respective time window that overlaps with an execution of only one thread instance.

20. A method comprising:

executing a first set of files on a computing system, and collecting a first set of performance data based on the executing of the first set of files;

performing a software update on the first set of files to produce a second set of files;

executing the second set of files on the computing system and collecting a second set of performance data based on the executing of the second set of files;

identifying a first subset of the first set of performance data, the first subset corresponding to an execution of one or more first thread instances, the first thread instances being instantiated using the first set of files;

identifying a second subset of the second set of performance data, the second subset corresponding to an execution of one or more second thread instances, the second thread instances being instantiated using the second set of files;

calculating a score based on the first subset and the second subset, the score indicating a difference in resource consumption between the first thread instances and the second thread instances; and generating and outputting a debugging message based on the score, wherein the first thread instances and the second thread instances have at least one of the same entry function and the same opcode, wherein the first subset includes only first slices that overlap with an execution of the first thread instances, and the second subset includes only second slices that overlap with an execution of the second thread instances.

* * * * *